United States Patent
Svensson et al.

(10) Patent No.: US 7,356,680 B2
(45) Date of Patent: Apr. 8, 2008

(54) METHOD OF LOADING INFORMATION INTO A SLAVE PROCESSOR IN A MULTI-PROCESSOR SYSTEM USING AN OPERATING-SYSTEM-FRIENDLY BOOT LOADER

(75) Inventors: Mats Svensson, Lund (SE); Peter Aulin, Malmö (SE); Niclas Bauer, Malmö (SE); Michael Rosenberg, Södra Sandby (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 482 days.

(21) Appl. No.: 11/040,798

(22) Filed: Jan. 22, 2005

(65) Prior Publication Data

US 2006/0168435 A1   Jul. 27, 2006

(51) Int. Cl.
 *G06F 9/00* (2006.01)
(52) U.S. Cl. ............... 713/1; 713/2; 713/100; 709/208; 709/212; 709/213
(58) Field of Classification Search ............ 713/1, 713/2, 100; 709/208, 212, 213
See application file for complete search history.

(56) References Cited

U.S. PATENT DOCUMENTS

| | | | |
|---|---|---|---|
| 4,943,911 A | | 7/1990 | Kopp et al. |
| 5,068,780 A | | 11/1991 | Bruckert et al. |
| 5,155,833 A | * | 10/1992 | Cullison et al. ............ 713/2 |
| 5,347,514 A | * | 9/1994 | Davis et al. ............ 370/429 |
| 5,652,886 A | | 7/1997 | Tulpule et al. |
| 5,754,863 A | * | 5/1998 | Reuter ............ 717/173 |
| 5,799,186 A | | 8/1998 | Compton |
| 5,835,784 A | | 11/1998 | Gillespie et al. |
| 5,944,820 A | | 8/1999 | Beelitz |
| 6,012,142 A | * | 1/2000 | Dokic et al. ............ 713/2 |
| 6,058,474 A | | 5/2000 | Baltz et al. |
| 6,438,683 B1 | | 8/2002 | Endsley |
| 6,490,722 B1 | | 12/2002 | Barton et al. |
| 6,601,167 B1 | | 7/2003 | Gibson et al. |
| 6,684,397 B1 | | 1/2004 | Byer et al. |
| 6,691,216 B2 | | 2/2004 | Kelly et al. |

(Continued)

FOREIGN PATENT DOCUMENTS

EP    1460539 A2    9/2004

(Continued)

OTHER PUBLICATIONS

PCT International Search Report, mailed Aug. 8, 2006, in connection with International Application No. PCT/EP2006/000351.

(Continued)

*Primary Examiner*—Thomas Lee
*Assistant Examiner*—Malcolm D Cribbs
(74) *Attorney, Agent, or Firm*—Potomac Patent Group PLLC

(57) ABSTRACT

A conventional bootloader can conflict with the operating system (OS) of a multi-processor system. An OS-friendly bootloader and methods are described that integrate an OS with a bootloader in any system in which a host processor and a client processor have a communication mechanism that requires the OS for the mechanism to work and the client has two memory systems: one visible to both host and client and one visible only to the client.

23 Claims, 2 Drawing Sheets

U.S. PATENT DOCUMENTS

| | | | |
|---|---|---|---|
| 6,760,785 | B1 | 7/2004 | Powderly et al. |
| 6,810,478 | B1 | 10/2004 | Anand et al. |
| 2002/0059560 | A1* | 5/2002 | Phillips ..................... 717/124 |
| 2002/0138156 | A1 | 9/2002 | Wong et al. |
| 2003/0126424 | A1 | 7/2003 | Horanzy et al. |
| 2004/0059906 | A1 | 3/2004 | Park et al. |
| 2004/0088697 | A1 | 5/2004 | Schwartz et al. |
| 2004/0215952 | A1 | 10/2004 | Oguma |

FOREIGN PATENT DOCUMENTS

| | | | |
|---|---|---|---|
| WO | | 01/27753 A2 | 4/2001 |

OTHER PUBLICATIONS

PCT Written Opinion, mailed Aug. 8, 2006, in connection with International Application No. PCT/EP2006/00351.

Hyde, J., "How to Make Pentium Pros Cooperate", BYTE, McGraw-Hill, Inc. St. Peterborough, US, vol. 21, No. 4, Apr. 1996, pp. 1770178, XP000586039.

Winderweedle, B. et al., "TMS320VC5470/5471 Bootloader Application Report", Texas Instruments, Dallas, TX, SPRA376, Jun. 2002.

"OMAP5910 Dual-Core Processor DSP Subsystems Reference Guide", Texas Instruments, Dallas, TX, SPRU672, Oct. 2003.

\* cited by examiner

METHOD OF LOADING INFORMATION INTO A SLAVE PROCESSOR IN A MULTI-PROCESSOR SYSTEM USING AN OPERATING-SYSTEM-FRIENDLY BOOT LOADER

BACKGROUND

This invention relates to initialization of electronic systems having multiple programmable processors.

The process of starting, or booting up, an electronic system having a programmable processor connected to one or more memory devices for storing program instructions, or code, and data is not as simple as it might seem at first glance. An important part of the reason for this is the need for the processor to begin operation in a well-defined state.

The traditional ways of loading program code and data to a bare system are either by "pushing" the code and data into the system's random-access memory (RAM) directly or by using a bootloader. The bootloader, which is sometimes called a boot loader or a bootstrap loader, is a set of instructions (i.e., program code, sometimes called "boot code") that can be either "pushed" into the system's RAM or loaded into the RAM from a non-volatile memory, such as read-only memory (ROM). In its execution by the processor, the bootloader then "drags" in the rest of the code and data and starts the system.

Examples of prior mechanisms for starting processor systems, including bootloaders, are U.S. Pat. No. 5,652,886 to Tulpule et al. and U.S. Pat. No. 6,490,722 to Barton et al. and U.S. Patent Application Publication No. US 2002/0138156 A1 to Wong et al. Barton et al., for example, describes a two-stage bootloader in which the second stage finds, verifies, and loads the operating system. In Wong et al., a multiprocessor system uses a master processor coupled to a ROM to transfer boot code to slave processors, with memory controllers in the slave processors denying memory access requests until the boot code has been transferred to their RAMs.

As indicated by Barton et al. and Wong et al., for example, starting up a multi-processor system, which can be generally considered as having a master or host processor, i.e., the system that orders the boot, and one or more slave or client processors, i.e., the system to be booted, is even more complicated than starting up a single-processor system.

Advantages of the "push" method are that it requires no code to execute in the slave during boot and that the only synchronization required is to hold the slave in a reset state and release it when loading is finished. Nevertheless, the "push" method works only when the memory or memories of the slave are visible to the host. This visibility can be implemented in several ways. For example, a memory may be visible on the address and data busses of both the host and the slave processors or direct memory access (DMA) transfers may be allowed from the host's memory or memories to the slave's memory or memories.

When the slave's memory to be loaded is invisible to the host, the "push" method cannot be used. In that situation, some form of bootloading must be used. As noted above, the bootloader technique requires either that boot code can be pushed onto the slave (which in this case is not possible) or that the slave can load code from a non-volatile memory. The bootloader then initiates a transfer of code from the host to the slave and finishes loading the memory.

Multi-processor systems in which some or all of a slave's memory is not visible to a host are possible. In such systems, it can be advantageous to take advantage of well-established software frameworks for loading and inter-processor communication, which render traditional bootloaders undesirable. Moreover, a bootloader can conflict with the operating system, which can be said to want to have control over the entire system and all of the memory.

Among the problems faced when integrating a bootloader with an operating system (OS) are ensuring that code that is not yet loaded is not executed, efficiently loading code to a memory or memories invisible to the host, and synchronizing with the host the loading and booting of the slave(s). Moreover, it is necessary to determine which portions of the system must be loaded to memories visible to both host and slave processors and how the binary image to be loaded should be arranged for the bootloader to work together with the OS. Another issue that can be important is the integration of the bootloader and the OS, as an already established framework for communication between host and slave then can be used during loading. Such a framework typically would include one or more primitives for communication that rely on OS-features.

SUMMARY

This invention provides, in one aspect, a method of loading program code into a slave processor in a multi-processor system that includes a master processor and the slave processor. The method includes the steps of resetting the slave processor and holding the slave processor in a reset state; pushing information into a first memory that is accessible by the master and slave processors; booting the slave processor; starting an operating system in the slave processor, including blocking scheduling of processes having program code located in a second memory that is accessible by the slave processor and inaccessible by the master processor; reserving an intermediate storage area in the first memory; sending to the master processor information about a location and size of the intermediate storage area reserved; based on the sent information, loading the intermediate storage area with information to be loaded into the second memory; sending a first message to the slave processor that indicates the intermediate storage area has been loaded and whether loading is finished or more information is to be loaded; copying information in the intermediate storage area to the second memory; and sending a second message to the master processor that indicates that information in the intermediate storage area has been copied.

In another aspect of the invention, a multi-processor system includes a host processor, at least one client processor, a first random-access memory accessible by the host and client processors, a second random-access memory accessible by the client processor and not accessible by the host processor, and a bootloader. The first memory includes an intermediate storage area, and the bootloader includes a host part and a client part. The host part is loadable into the first random-access memory and has a first stage and a second stage. The first stage resets and holds the client processor in a reset state and pushes information into the first random-access memory. The second stage is initiated by the client part, loads the intermediate storage area with information to be loaded to the second random-access memory, and sends to the client part a first message indicating the intermediate storage area is loaded. The client part is loadable into the first random-access memory, starts an operating system including an idle process and initially blocking scheduling of all processes having program code located in the second random-access memory, copies information loaded into the intermediate storage area to the second random-access memory, and sends to the host part a second message indicating information has been copied.

In another aspect of the invention, a computer-readable medium contains a computer program for loading information into a slave processor in a multi-processor system that includes a master processor and the slave processor. The computer program performs the steps of resetting the slave processor and holding the slave processor in a reset state; pushing information into a first memory that is accessible by the master and slave processors; booting the slave processor; starting an operating system in the slave processor, including blocking scheduling of processes having program code located in a second memory that is accessible by the slave processor and inaccessible by the master processor; reserving an intermediate storage area in the first memory; sending to the master processor information about a location and size of the intermediate storage area reserved; based on the sent information, loading the intermediate storage area with information to be loaded into the second memory; sending a first message to the slave processor that indicates the intermediate storage area has been loaded and whether loading is finished or more information is to be loaded; copying information in the intermediate storage area to the second memory; and sending a second message to the master processor that indicates that information in the intermediate storage area has been copied.

BRIEF DESCRIPTION OF THE DRAWINGS

The various features, objects, and advantages of this invention will be understood by reading this description in conjunction with the drawings, in which.

DETAILED DESCRIPTION

As noted above, a conventional bootloader can conflict with the operating system of a multi-processor system. This application describes an OS-friendly bootloader and methods that meet the challenge of integrating an OS with a bootloader in systems in which the host and a client have a communication mechanism that requires the OS for the mechanism to work and the client has two memory systems: one visible to both host and client and one visible only to the client.

Figure 1:
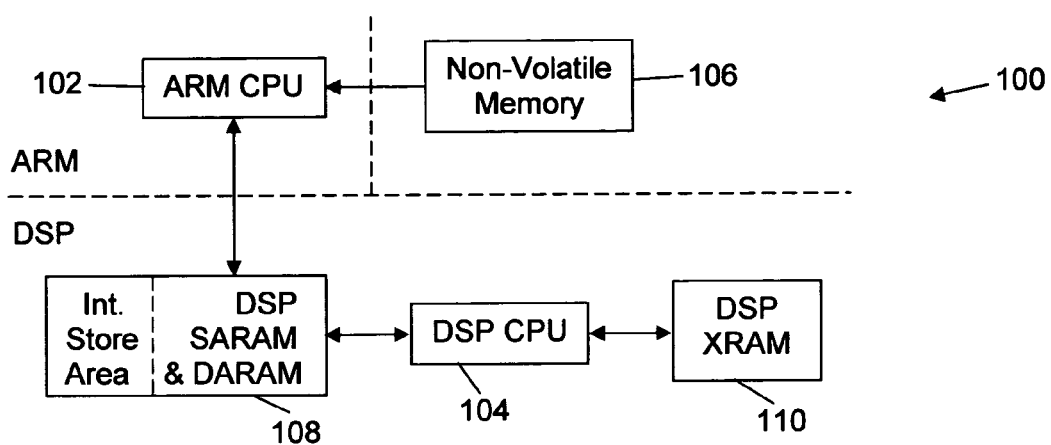
FIG. 1 depicts a multi-processor system.

FIG. 1 depicts such a multi-processor system 100 that includes a host processor 102 and a client processor 104. It will be appreciated that although FIG. 1 shows one client processor 104, more can be provided. It will also be appreciated that the host and client processors may be any programmable electronic processors. In the example depicted in FIG. 1, the processor 102 is shown as the central processing unit (CPU) of an advanced RISC machine (ARM), and the processor 104 is shown as the CPU of a digital signal processor (DSP) device. The dashed line in FIG. 1 depicts the hardware boundary between the host and slave devices, in this example, the ARM and the DSP, and also a non-volatile memory 106. The memory 106 may be a ROM, a flash memory, or other type of non-volatile memory device.

Most commercially available DSP devices include on-chip memories, and as indicated in FIG. 1, the DSP includes "internal" single-access RAM (SARAM) and dual-access RAM (DARAM) 108, as well as an "external" RAM (XRAM) 110. An intermediate storage area, indicated by the dashed line, is defined within the memory 108 as described in more detail below. The arrows in FIG. 1 indicate access paths, e.g., busses and DMA paths, between the CPUs and the memories. The ARM host CPU 102 can access the non-volatile memory 106 and the SARAM and DARAM 108 of the DSP, but not the DSP's XRAM 110, and the DSP slave CPU 104 can access all of the RAMs 108, 110.

The SARAM and DARAM 108 can be loaded from the non-volatile memory 106 by the trivial "push" method. When code needs to be loaded to the XRAM 110 during boot, however, a bootloader solution is required because the XRAM 110 is invisible to, i.e., not accessible by, the CPU 102 and so boot code cannot be pushed to the XRAM 110.

Figure 2:
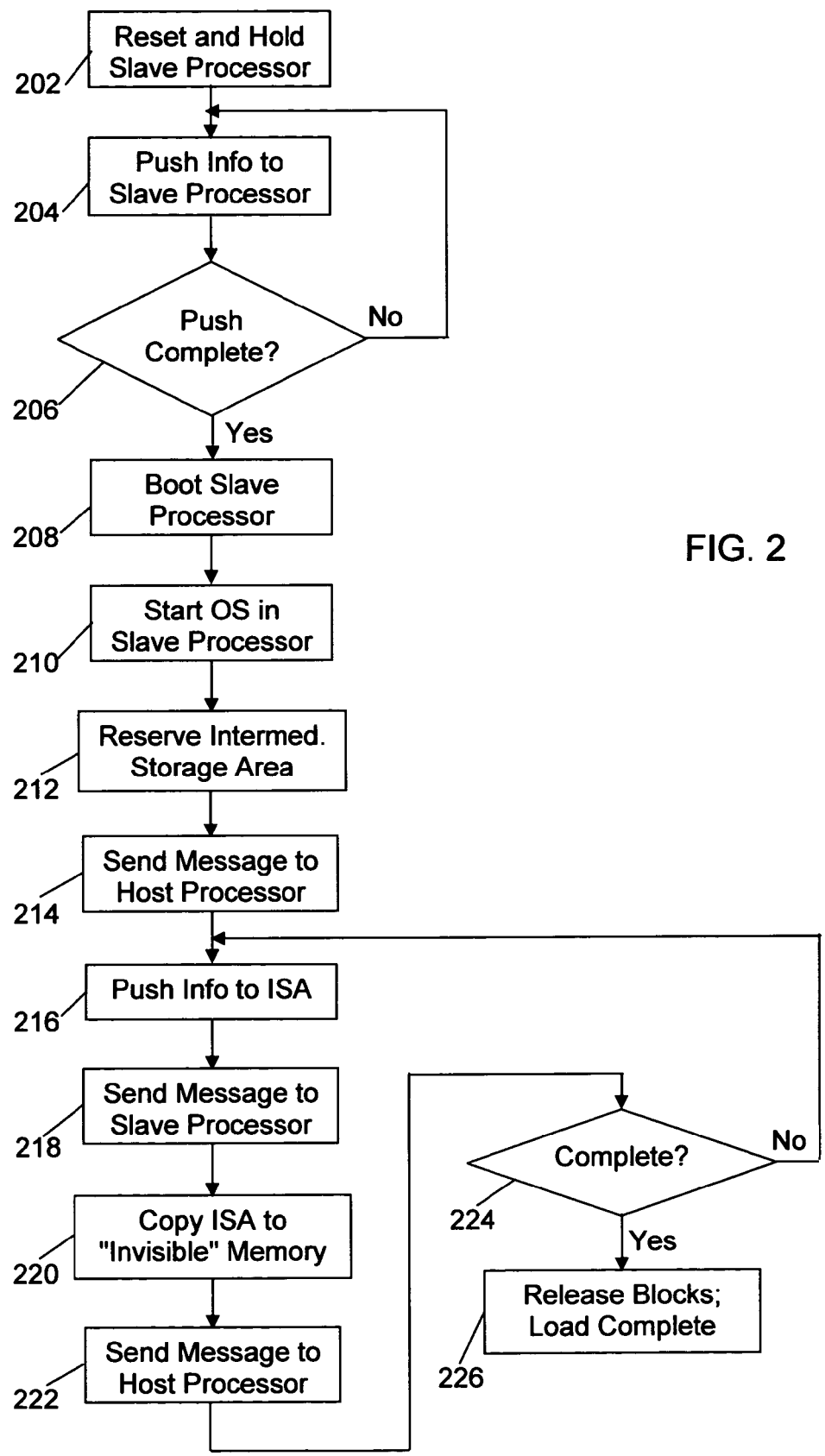
FIG. 2 is a flowchart of an OS-friendly bootloader.

As described in more detail below and in connection with the flow chart of FIG. 2, an OS-friendly bootloader advantageously has a host part and a client part that is loaded into a memory or memories visible to both the master and the slave (e.g., SARAM and DARAM 108).

The host part of the OS-friendly bootloader may be considered as including two stages or modes of operation. The first stage resets and holds the slave 104 in the reset state (Step 202) and pushes information (program instructions and/or data) (Step 204) in the usual way from the non-volatile memory 106 into the commonly visible memories 108. The information pushed into these memories is mainly the bootloader, the OS, and any necessary start-up code for the OS. It should be appreciated that an application or applications or parts thereof may also be pushed into these memories at start-up and may start executing during the loading of the "external" memory 110. When this "push" is finished (Step 206), the slave 104 is allowed to boot (Step 208) and to start up the OS (e.g., it is released from the reset state) and its normal communication mechanisms (Step 210). The host part then awaits a message from the slave, which initiates operation of its second stage as described in more detail below.

The slave part of the OS-friendly bootloader that is loaded ("pushed" by the host part's first stage) into the commonly visible memories 108 starts the operating system, carrying out the following operations (Step 210). First, interrupt handlers are created. The code for the interrupt handlers must be located in the memory that is already loaded because an interrupt may occur at any time. Second, data structures (e.g., process control blocks and stacks) of common processes, i.e., processes that run in both the host and the slave, are created. It should be understood that since these common processes have not yet executed, their code may be loaded at a later time and may very well be located in "external" memory visible only to the slave, e.g., XRAM 110. Third, the system idle process is created. The code for the idle process must be located in the memory that is already loaded because the idle process is the process selected to run by the OS if there is nothing useful to do. Fourth, the scheduling of at least all processes residing in, i.e., having program code or data located in, the "external" memory 110 is blocked. Execution of processes residing in the "internal" memory can thus advantageously start or continue in parallel with the loading of the "external" memory as noted above. It is also possible to stop scheduling all processes except the idle process, but this is not necessary. Making this blocking the last thing done before the OS scheduler switches on ensures that the code in these processes will not run when the scheduler releases. Finally, the OS scheduler is released, which allows the OS to start executing code and scheduling processes. It will be understood that since at least all external-memory-process scheduling was blocked, all that the OS can now do is schedule interrupts and the idle process.

At this point, the slave 104 is partly up and running. The slave part of the OS-friendly bootloader has been loaded, and the slave's idle process is executing. The slave's OS can schedule and execute code in response to interrupts and can schedule the idle process and any unblocked processes having code residing in internal memory. OS mechanisms for which all code and data accesses are in memory that has already been loaded (SARAM and DARAM 108, in this example) are available, including the usual communication mechanisms. These OS communication mechanisms, being high-level abstractions of DMA, shared memory, and structured registers, are more capable than simple semaphores and enable the host processor to communicate efficiently with a processor (the slave) that has not completely started, which is to say a processor that is executing mainly only the OS, interrupt services, and processes residing in "internal" RAM.

The idle process reserves a block of memory in the slave's heap of memory that is located in the memory visible to the host, such as "internal" memory 108 (Step 212). As described in more detail below, this reserved block of memory is used for intermediate storage of information (code and/or data) to be transferred to the slave-private memory, i.e., the memory that is invisible to the host, such as "external" XRAM 110. The slave's idle process advantageously uses the established communication mechanisms to send to the host (Step 214) information about the address and size or length of the intermediate storage area reserved in the previous step. After sending the information, which may be contained in one or more suitable messages, the slave blocks, awaiting a message from the host. While "blocked", the slave does not conduct any further loading activities until it receives the host's response.

It will be understood that whether the slave's OS acts on an interrupt at this stage depends on the nature of the interrupt. Since many OS mechanisms (like those used to communicate with the host, for example) rely on interrupts, and it cannot be known in advance when an interrupt will occur, all interrupt code must have been loaded into "internal" memory. In that respect, interrupts are served during the second stage of the bootloading. Nevertheless, if an interrupt is to trigger a chain of events such as processes starting to do some data processing and the code or data for those processes are located or will be located in "external" memory, the interrupt is blocked and the interrupt service puts the request in the "in-queue" of that process so that the request will be served after booting has finished and that process can execute.

On receipt of the slave's information, the second stage of the host bootloader fills the intermediate storage area with information (code and/or data) to be loaded into the slave's invisible memory (Step 216). Code and data is pushed to the intermediate storage area in the usual way because this area is memory that both processors can access, but the push is activated through the OS communication mechanisms.

The host now sends a message to the slave (Step 218) that indicates the intermediate storage area has been loaded and whether loading is finished or more code and/or data is available. This is the message the slave is waiting for. The host in turn now blocks, awaiting a message from the slave. The slave copies the contents of the intermediate storage area to appropriate locations in its slave-private memory (Step 220), thereby implementing its actual loading. The slave then sends a message to the host (Step 222) that indicates that the slave has copied the contents of the intermediate storage area.

If there is more code and/or data to load (Step 224), this cycle of copying and messaging (Steps 216-224) can be repeated as many times as required. When the loading is finished, i.e., when no more information needs to be copied to the slave, the slave releases the blocking of processes that were blocked earlier, thereby allowing scheduling of code in its slave-private memory (Step 226). Loading is now complete.

Figure 3:
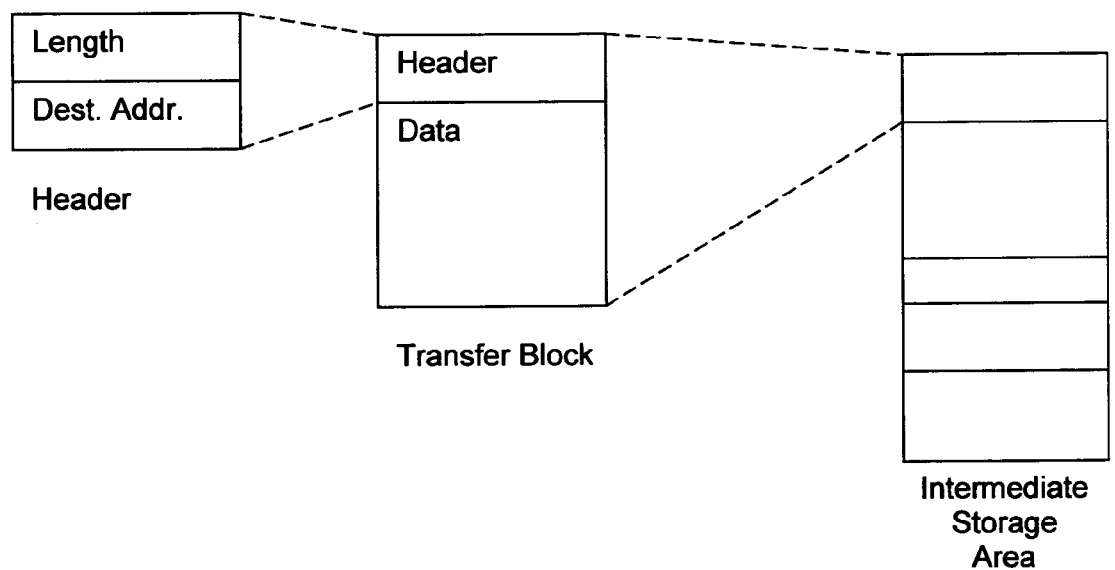
FIG. 3 depicts an example of an organization of an intermediate storage area.

As described above, the host fills the intermediate storage area in the memory 108 with code and data that the slave further copies to end destinations in the slave-private memory 110. Perhaps the simplest way of doing this is to precede all code and data in the intermediate storage area with a tag that contains the destination address and length of the block to be loaded. FIG. 3 depicts one example of such an organization of the intermediate storage area. A block of code and/or data to be transferred into the intermediate storage area includes a header that indicates the length of the block and where it is to be loaded in the slave memory, i.e., the destination address. As indicated by the dashed lines in FIG. 3, several such blocks may be concatenated in the intermediate storage area.

The information (code and data) to be loaded can be arranged in many ways in the intermediate storage area and memories. Often the information is arranged as blocks of consecutive information that are to be loaded to different addresses, and thus an arbitrarily chosen size of the intermediate storage area may not match the sizes of all such blocks. Still, it should be understood that the system will operate more efficiently when the intermediate storage area is always filled. This means that if the blocks to be loaded are smaller than this area, a transfer of several (smaller) blocks should be done at the same time. This also means that a block should be split if it is larger than the remaining part of the intermediate storage area, and one part transferred to the intermediate storage area with the remaining part transferred in the next block. Moreover, if a block is several times larger than the intermediate storage area, it may have to be split more than once. All of this splitting and concatenation is done in the host part of the OS-friendly bootloader in ways that are well known to computer scientists. From the point of view of data communications engineers, the host part of the OS-friendly bootloader is thus a kind of "transport layer".

The artisan will understand the benefit of this splitting and concatenation of information into transfer blocks. Some kind of communication mechanism is required to perform the actual transfers of information between memories, and whatever the mechanism used, fewer large transfers are typically preferable to more small transfers. A kept-full intermediate storage area can make the most efficient use of the available bandwidth by advantageously minimizing overhead on the communications channel. Each message requires some amount of administration and administrative information, and so fewer messages means less overhead.

A good example of the benefit of block splitting and concatenation effect is DMA as the communication mechanism. DMA typically requires some setup overhead (i.e., it takes some time to set up), but then DMA is very efficient once it has been started because transfers can be carried out in minimal CPU cycles. In order to gain the greatest benefit from the use of DMA, the largest DMA transfer permitted by the hardware should be done every time. Thus, it is currently believed to be advantageous to set the size of the intermediate storage area to the maximum DMA block size.

The host part of the OS-friendly bootloader should "know" when to leave its first stage (loading information by pushing it into memory) and to enter its second stage (loading information through one or more communication mechanisms). After all, the host cannot push information into memory that is invisible to it. Although the slave sends a message to the host part when it has reached the idle process, this may not be enough for the host part to tell the slave to start executing. This transition from pushing to bootloading will be seen as a change from the paradigm of passive loading (i.e., no code executing in the slave) to the paradigm of active loading (i.e., a partly alive, executing slave).

One way for the host part to know when to change stages is to tag the code and data to be loaded with information on what memory it shall be loaded to. For example, information intended for the invisible memory could include a tag or tags that indicate the information is to be loaded to the invisible memory. The absence of such a tag could indicate that the information is to be loaded to the visible memory, although it will be appreciated that a tag explicitly indicating that the information is to be loaded to the visible memory could also be used. This enables the host to do two passes over the information and load only the information required in each pass. In the first pass, things that go into the internal memory would be found and loaded, and in the second pass, things that go into the external memory would be found and loaded.

Another way, which currently appears to be simpler, is to arrange the slave-private memory such that all of it resides above (or below) a predetermined address. The information to be transferred is then sorted accordingly, with all sections of code and data to be loaded to the slave-private memory put at the end (or the beginning) of the sorted image. Then, all the host part of the OS-friendly bootloader has to do is to enter its second stage when an address larger (or smaller) than the predetermined (boundary) address is encountered.

In order to save memory or increase code integrity and platform security on the host side, information to be loaded to the slave can also be pre-processed in several different ways. For example, the information may be compressed according to a suitable algorithm, thereby reducing the size of the memory needed for it on the host side. For another example, the information may be encrypted, thereby strengthening platform security, as a potential hacker will not be able to disassemble the information easily. It is currently believed that encryption is valuable if the information to be loaded to the slave is stored in the internal file system of the host, where the information is available (at least in theory) to anyone.

From this description, it will be understood that OS mechanisms are available to the slave part of the OS-friendly bootloader that is executed by the slave processor and that the slave can reuse existing OS-dependent code required for communication. Moreover, the OS-friendly bootloader uses loading resources (e.g., DMA) efficiently, with the host part automatically deciding when to switch from a first stage, or push mode, to a second stage, or bootloader mode.

It is expected that this invention can be implemented in a wide variety of environments, including for example mobile communication devices. Newer ones of such devices can employ the OS-friendly bootloader described here to boot their DSPs, which may be provided to handle multimedia tasks, in cooperation with their main-processor software systems.

The OS-friendly bootloader described here takes the operating system into account and actually executes on an operating system. The host is fully running when the slave is booted or re-rebooted. This bootloader does not require the host processor to be in a certain state in order to start up the slave processor. Indeed, the startup of the slave processor can be carried out any time during the execution of the host processor software. The OS-friendly bootloader does not need a special executable file that is run in the slave processor while information is being loaded to it from the host processor and the host-inaccessible RAM. One executable is linked to all of the slave processor's memories. The slave is booted before all code is loaded, but code that is linked to host-inaccessible memory is not run until it is loaded with the help of code that is linked to the slave processors host-accessible memory.

It will therefore be understood that the OS-friendly bootloader described here also makes it possible to change software executing in the slave processor and to start slave execution of an application software before it is completely loaded. One or more application processes can be chosen for "pushing" with the bootloader into the slave processor's host-accessible memory, and those processes will start executing at the same point in time as the slave processor's host-inaccessible memory begins to be loaded.

This capability can be important in many devices and many use cases. In a mobile telephone, for example, such use cases include making a call, receiving a call, compressing/decompressing speech, playing music files, etc. With the OS-friendly bootloader described here, one can load and execute new software in the slave processor virtually anytime the host processor is running.

It will be appreciated that procedures described above are carried out repetitively as necessary. To facilitate understanding, many aspects of the invention are described in terms of sequences of actions that can be performed by, for example, elements of a programmable computer system. It will be recognized that various actions could be performed by specialized circuits (e.g., discrete logic gates interconnected to perform a specialized function or application-specific integrated circuits), by program instructions executed by one or more processors, or by a combination of both.

Moreover, the invention described here can additionally be considered to be embodied entirely within any form of computer-readable storage medium having stored therein an appropriate set of instructions for use by or in connection with an instruction-execution system, apparatus, or device, such as a computer-based system, processor-containing system, or other system that can fetch instructions from a medium and execute the instructions. As used here, a "computer-readable medium" can be any means that can contain, store, communicate, propagate, or transport the program for use by or in connection with the instruction-execution system, apparatus, or device. The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium include an electrical connection having one or more wires, a portable computer diskette, a RAM, a ROM, an erasable programmable read-only memory (EPROM or Flash memory), and an optical fiber.

Thus, the invention may be embodied in many different forms, not all of which are described above, and all such forms are contemplated to be within the scope of the invention. For each of the various aspects of the invention, any such form may be referred to as "logic configured to" perform a described action, or alternatively as "logic that" performs a described action.

It is emphasized that the terms "comprises" and "comprising", when used in this application, specify the presence of stated features, integers, steps, or components and do not preclude the presence or addition of one or more other features, integers, steps, components, or groups thereof.

The particular embodiments described above are merely illustrative and should not be considered restrictive in any way. The scope of the invention is determined by the following claims, and all variations and equivalents that fall within the range of the claims are intended to be embraced therein.

What is claimed is:

1. A method of loading information into a slave processor in a multi-processor system that includes a master processor and the slave processor, comprising the steps of:
    a) resetting the slave processor and holding the slave processor in a reset state;
    b) pushing information into a first memory that is accessible by the master processor and the slave processor;
    c) booting the slave processor;
    d) starting an operating system in the slave processor, including blocking scheduling of processes having program code located in a second memory that is accessible by the slave processor and inaccessible by the master processor;
    e) reserving an intermediate storage area in the first memory;
    f) sending to the master processor information about a location and size of the intermediate storage area reserved;
    g) based on the sent information, loading the intermediate storage area with information to be loaded into the second memory;
    h) sending a first message to the slave processor that indicates the intermediate storage area has been loaded and whether loading is finished or more information is to be loaded;
    i) copying information in the intermediate storage area to the second memory; and
    j) sending a second message to the master processor that indicates that information in the intermediate storage area has been copied.

2. The method of claim 1, further comprising the step of, if there is more information to be loaded, repeating steps g-j until no more information is to be loaded.

3. The method of claim 1, wherein step d) includes creating interrupt handlers and creating data structures of processes that run in both the master processor and the slave processor.

4. The method of claim 1, wherein the information pushed into the first memory includes the operating system and at least a portion of at least one application.

5. The method of claim 1, wherein step d) includes blocking scheduling of all processes except an idle process.

6. The method of claim 1, wherein step g) includes preceding the information to be loaded into the second memory with at least one tag that indicates an address in the second memory and a length of the information to be loaded.

7. The method of claim 1, wherein step g) includes splitting information to be loaded into the second memory into blocks and loading the intermediate storage area with a first block.

8. The method of claim 7, further comprising the step of repeating steps g-j for each block in succession.

9. The method of claim 1, wherein information pushed into the first memory includes at least one tag that indicates whether the information is to be loaded to the second memory.

10. The method of claim 1, wherein information to be loaded to the second memory is at least one of compressed and encrypted.

11. A multi-processor system, comprising:
    a host processor;
    at least one client processor;
    a first random-access memory accessible by the host processor and the client processor, wherein the first random-access memory includes an intermediate storage area;
    a second random-access memory accessible by the client processor and not accessible by the host processor; and
    a bootloader that includes:
        a host part that is loaded into the first random-access memory, that has a first stage that resets and holds the client processor in a reset state and pushes information into the first random-access memory, and that has a second stage that is initiated by a client part, that loads the intermediate storage area with information to be loaded to the second random-access memory, and that sends to the client part a first message indicating the intermediate storage area is loaded; and
        a client part that is loaded into the first random-access memory, that starts an operating system including an idle process and initially blocking scheduling of all processes having program code located in the second random-access memory, that copies information loaded into the intermediate storage area to the second random-access memory, and that sends to the host part a second message indicating information has been copied.

12. The system of claim 11, wherein the information pushed into the first memory by the first stage includes the client part of the bootloader and the operating system, and the second stage enables the host and client processors to exchange messages.

13. The system of claim 12, wherein the information pushed into the first memory by the first stage includes at least a portion of at least one application.

14. The system of claim 11, wherein the client part initially blocks scheduling of all processes except the idle process.

15. The system of claim 11, wherein the idle process sends to the host processor information about an address and a length of the intermediate storage area.

16. The system of claim 11, information to be loaded into the second random-access memory includes at least one tag that indicates an address in the second random-access memory and a length of the information to be loaded.

17. The system of claim 11, wherein the intermediate storage area is organized as blocks of information, and each block includes a header that indicates a length of the block and an address for the block in the second random-access memory.

18. The system of claim 11, wherein information pushed into the first random-access memory includes at least one tag that indicates whether the information is to be loaded to the second random-access memory.

19. The system of claim 11, wherein information to be loaded to the second random-access memory is at least one of compressed and encrypted.

20. A computer-readable storage medium containing a computer program for loading information into a slave processor in a multi-processor system that includes a master processor and the slave processor, wherein the computer program performs the steps of:
- a) resetting the slave processor and holding the slave processor in a reset state;
- b) pushing information into a first memory that is accessible by the master processor and the slave processor;
- c) booting the slave processor;
- d) starting an operating system in the slave processor, including blocking scheduling of processes having program code located in a second memory that is accessible by the slave processor and inaccessible by the master processor;
- e) reserving an intermediate storage area in the first memory;
- f) sending to the master processor information about a location and size of the intermediate storage area reserved;
- g) based on the sent information, loading the intermediate storage area with information to be loaded into the second memory;
- h) sending a first message to the slave processor that indicates the intermediate storage area has been loaded and whether loading is finished or more information is to be loaded;
- i) copying information in the intermediate storage area to the second memory; and
- j) sending a second message to the master processor that indicates that information in the intermediate storage area has been copied.

21. The computer readable storage medium of claim 20, wherein the computer program further performs the step of, if there is more information to be loaded, repeating steps g-j until no more information is to be loaded.

22. The computer readable storage medium of claim 20, wherein step g) includes preceding the information to be loaded into the second memory with at least one tag that indicates an address in the second memory and a length of the information to be loaded.

23. The computer readable storage medium of claim 20, wherein step g) includes splitting information to be loaded into the second memory into blocks and loading the intermediate storage area with a first block.

* * * * *